United States Patent [19]

Ferrari

[11] Patent Number: 4,594,744
[45] Date of Patent: Jun. 17, 1986

[54] HONEYBEE ENPOLLINATING SYSTEM USING MULTI-PURPOSE BEEHIVE ENTRANCE DEVICE

[76] Inventor: Thomas E. Ferrari, 2028 W. Seneca St., Lodi, N.Y. 14860

[21] Appl. No.: 697,043

[22] Filed: Jan. 31, 1985

[51] Int. Cl.[4] .......................................... A01K 47/06
[52] U.S. Cl. ...................................................... 6/4 R
[58] Field of Search ....................................... 6/1, 4 R

[56] References Cited

U.S. PATENT DOCUMENTS

| | | | |
|---|---|---|---|
| 204,551 | 6/1878 | Erb | 6/1 |
| 1,270,507 | 6/1918 | Fleming | 6/1 |
| 1,518,934 | 12/1924 | Keil | 6/4 R X |
| 2,025,908 | 12/1935 | Schlegel | 6/4 R |
| 2,188,719 | 1/1940 | King | 6/4 R |
| 2,435,951 | 2/1948 | Antles | 6/4 R |
| 2,485,879 | 10/1949 | Harwood | 6/4 R |
| 3,069,702 | 12/1962 | Reed | 6/4 R |
| 3,343,186 | 9/1967 | Dunand | 6/4 R X |
| 3,371,360 | 3/1968 | Antles et al. | 6/4 R |
| 3,408,668 | 11/1968 | Paoletti | 6/4 R |
| 4,300,250 | 11/1981 | Taylor | 6/1 |

Primary Examiner—Robert P. Swiatek
Attorney, Agent, or Firm—Stonebraker, Shepard & Stephens

[57] ABSTRACT

Bees are enpollinated by using a hive entrance modifier 10 formed as an elongated body that rests on the bottom board 52 of the hive 50 and extends over the hive entrance 51. In a bee-enpollinating position, body 10 closes hive entrance 51 except for a vent region 16 and a bee passageway substantially narrower than hive entrance 51. The bee passageway is recessed into body 10 to accommodate both incoming and outgoing bees and is formed as an inclined ramp 20 sloping downward toward hive entrance 51 from a top 13 of body 10 to bottom board 52 of hive 50. Recess 16 contains and shelters pollen 60 poured into the passageway to rest on bottom board 52 in hive entrance 51 for enpollinating both incoming and outgoing bees. This quickly disperses pollen 60 throughout the hive's bee colony so that all the enpollinated bees quickly carry pollen 60 to the blossoms they visit.

20 Claims, 7 Drawing Figures

U.S. Patent   Jun. 17, 1986   Sheet 1 of 3   4,594,744
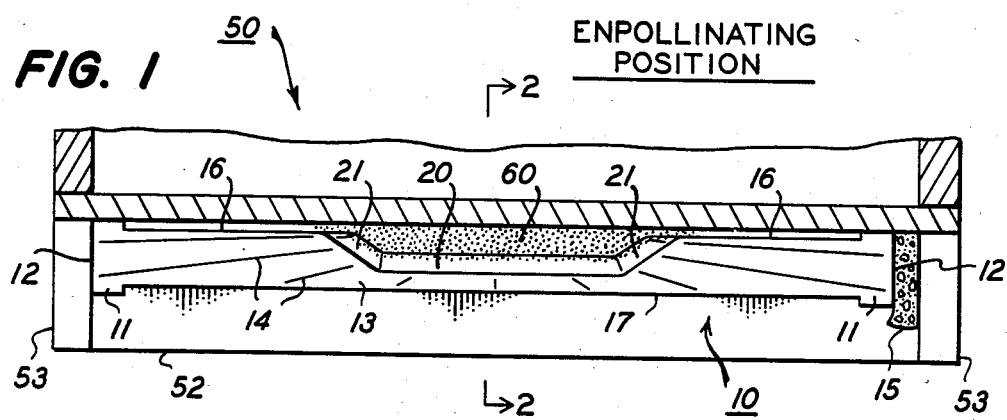
FIG. 1   ENPOLLINATING POSITION
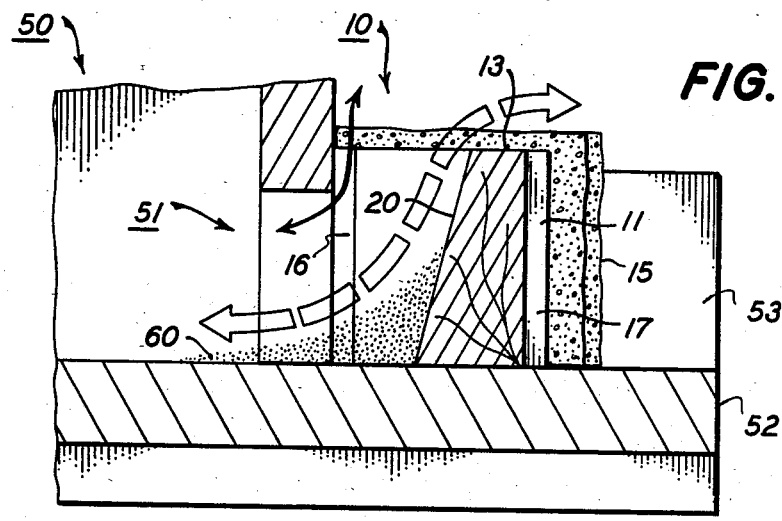
FIG. 2
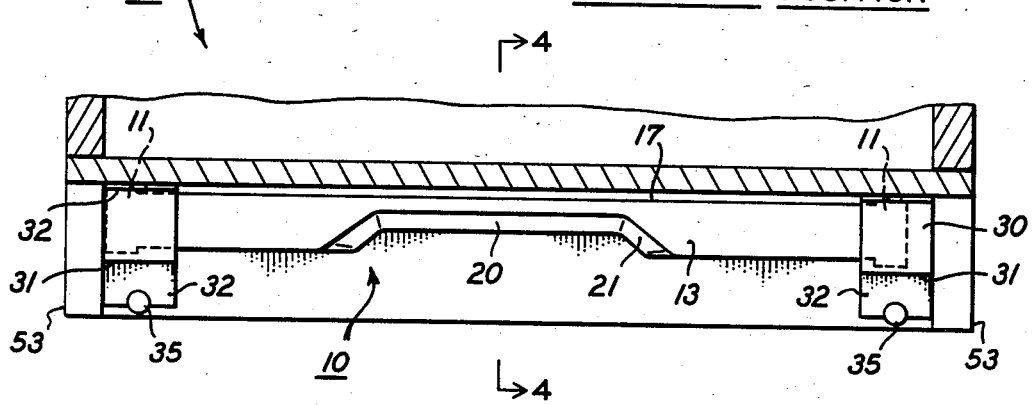
FIG. 3   TRANSPORT POSITION

WINTER POSITION

HONEYBEE ENPOLLINATING SYSTEM USING MULTI-PURPOSE BEEHIVE ENTRANCE DEVICE

BACKGROUND

Although farmers and pollination technicians have long recognized the economic importance of thoroughly pollinating a crop at the right time with the right pollen, they have found this difficult to achieve reliably and economically. One way to improve pollination is to dust the desired pollen onto honeybees flying to an orchard so that the bees deliver effective pollen when it is needed. U.S. Pat. Nos. 2,435,951; 2,485,879; 3,069,702; and 3,371,360 all suggest hive exit structures holding pollen that bees pick up on their way out and deliver to the orchard. Returning bees enter the hive via a different passageway that has no pollen. These devices have been cumbersome, expensive, and wasteful of valuable pollen.

I have devised a much simpler and more effective way of enpollinating a colony of honeybees with pollen intended for the blossoms being visited by the bees. My system is simple, economical, convenient, reliable, applicable to existing hives, and effective in its use of pollen.

SUMMARY OF THE INVENTION

My system of enpollinating bees uses a beehive entrance modifier that rests on a bottom board of a hive and extends an elongated body over the length of the hive entrance. In a bee-enpollinating position, the body closes the hive entrance except for a vent region and a narrow bee passageway recessed into the body to enable bees to pass in and out. The passageway is also formed as an inclined ramp sloping downward toward the hive entrance from the top of the body to the bottom board so that bees travel up and down the ramp. The body around the ramp contains and shelters pollen poured into the passageway to rest on the bottom board in the hive entrance for enpollinating both incoming and outgoing bees. The vent region of the body extends along a substantial length of the hive entrance outside the passageway and is spaced from the hive entrance by a venting distance too small for a bee to pass through.

The entrance modifier is not only effective in protecting pollen from weather, while dispersing it rapidly throughout a colony of bees, but the entrance modifier can also be used for constricting the hive entrance for winter and for transport.

DRAWINGS

FIG. 1 is a fragmentary plan view of the front of a beehive showing a preferred embodiment of my entrance modifier in a bee-enpollinating position on the bottom board at the hive entrance;

FIG. 2 is an enlarged, cross-sectional view of my hive entrance modifier, taken along the line 2—2 of FIG. 1;

FIG. 3 is a plan view similar to the view of FIG. 1, but showing my hive entrance modifier in a transport position;

DETAILED DESCRIPTION

Figure 4:
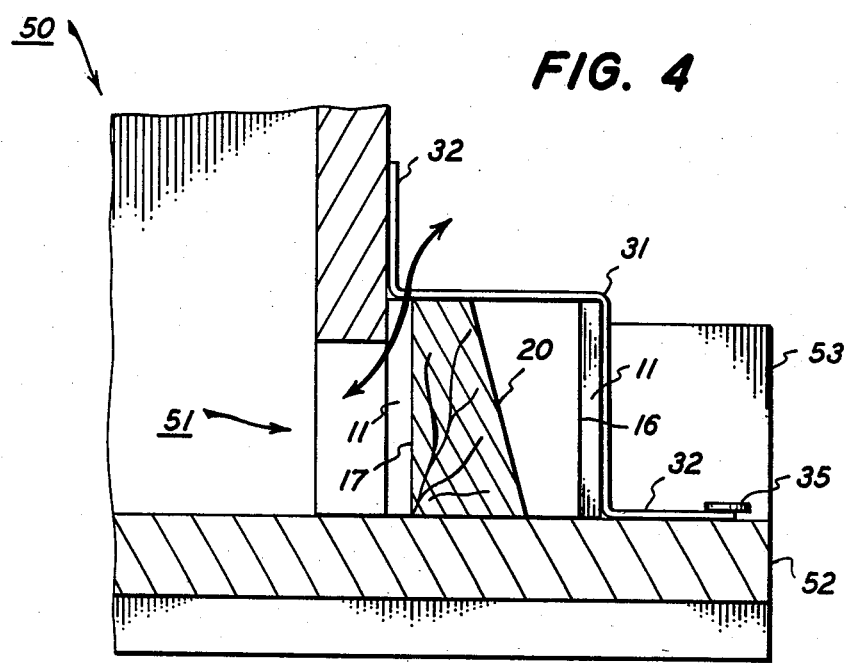
FIG. 4 is an enlarged cross-sectional view of my hive entrance modifier, taken along the line 4—4 of FIG. 3.

My invention takes advantage of the discovery that pollen applied to a few of the bees of a hive colony rapidly disperses throughout all the bees in the colony, because of the way bees climb over and brush against each other. Using this principle, I have discovered that the enpollinating of bees need not be limited to those bees that are outward bound and that pollen applied to all bees passing either in or out of a hive quickly spreads throughout the bee colony. All the members of the colony then become bearers of the desired pollen and rapidly distribute it to the blossoms they visit.

Proceeding from this discovery, I have devised a simple beehive entrance modifier that is effective for enpollinating bees and accomplishes several other functions. It affords adequate hive ventilation and provides a narrow bee traffic passageway that bees quickly learn to use and that contains and shelters the valuable pollen where it gets dusted onto the bees traversing the passageway and, from them, distributed among all the members of the bee colony. The same entrance modifier, oriented in different positions, can also be used for winter entrance protection and for transporting a hive.

The body of my hive entrance modifier 10 extends along an entrance 51 of a beehive 50. It rests on bottom board 52 at the bottom of entrance 51 and extends generally between side rails 53 of bottom board 52. It is preferably made of wood or resin material and is preferably about 13 inches long and about 1 inch square in maximum girth. It is shaped to perform a combination of venting, bee traffic, and bee-enpollinating functions as explained below.

Each end region 11 of modifier 10 is a full size of preferably one inch square for about one-half inch inward from end surfaces 12. I prefer making modifier 10 short enough to fit the narrowest hive entrances and then using an extender such as a compressible foam resin block 15 to fill or close any gap between a body end 12 and rail 53 at the end of a hive entrance. Compressed block 15 also helps hold body 10 in place. End clamps can accomplish a similar purpose as explained below.

Figure 5:
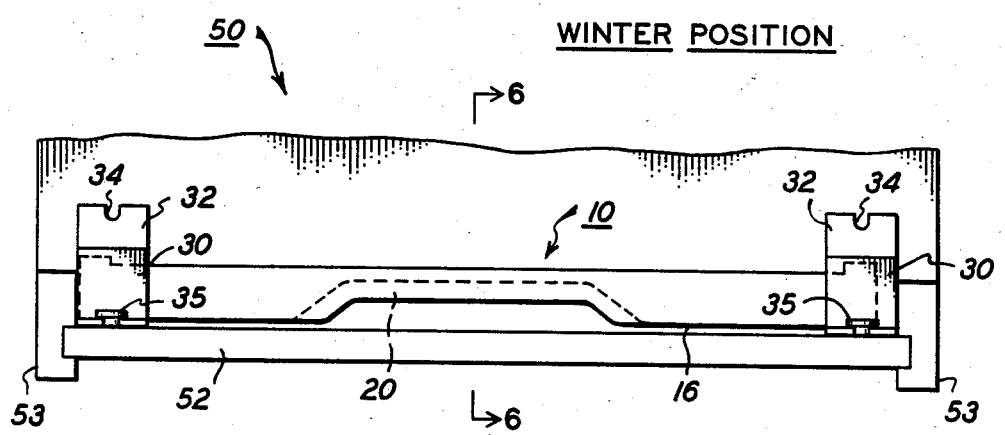
FIG. 5 is a fragmentary front elevational view of a beehive showing my hive entrance modifier in a winter position.

Modifier 10 can be used in three different positions as shown in FIGS. 1, 3, and 5. These respectively serve for enpollinating bees (FIG. 1), transport of a beehive (FIG. 3), and winter protection (FIG. 5).

Relative to the enpollinating position of FIG. 1, body 10 has a top surface 13 facing upward slightly above the top of hive entrance 51. Top 13 affords a landing surface for bees, which are used to landing on the horizontal surface of bottom board 52 at the hive entrance.

Confronting hive entrance 51 in the enpollinating position of FIG. 1 is a ventilating recess 16 extending between end regions 11. Recess 16 is preferably about one-eighth inch deep so as to stand off from the front face of hive 50 by about one-eighth inch. This is wide enough so bees can fan air and vapor out of hive 50 through vent recess 16 as shown by the single line arrow in FIG. 2, but it is narrow enough to keep bees from passing through.

Preferably in a central region of body 10 between end regions 11 and vent regions 16 is a narrow bee traffic ramp 20 that restricts bee traffic in and out of hive 50 to a narrow passageway that is preferably about five inches wide. Ramp 20 is recessed far enough into the face of body 10 confronting hive entrance 51 to allow bees to move freely in and out of hive 50 as shown by the broken line arrow. Ramp 20 is preferably inclined by 60° to 80° from horizontal and, in the enpollinating position of FIG. 1, slopes downward and toward hive entrance 51 from top 13 to bottom board 52. Bees can work their way readily up and down inclined ramp 20, which concentrates all bee traffic in a narrow region of hive entrance 51. The side edges 21 of ramp 20 are preferably rounded and sloped to converge as they extend downward from top 13 to bottom board 52. This gives bee traffic ramp 20 a sort of funnel shape sloping into hive entrance 51.

Body 11 can be colored a dark color attractive to bees or can be a light or natural wood color, in which case I prefer red lines 14 painted on top 13 as shown in FIG. 1 to lead toward traffic ramp 20. This may help bees find the entrance available down ramp 20 by following dark red lines 14 that are analogous to dark lines leading into flower blossoms. Even without lines 14, however, bees quickly learn how to enter and exit via ramp 20.

With body 10 placed in the enpollinating position of FIG. 1, pollen 60 can be poured into the funnel-shaped region formed by ramp 20 to spill down ramp 20 and collect on bottom board 52 within hive entrance 51. In such a position, pollen 60 is protected from wind and securely contained within the bee traffic region formed by ramp 20. Bees passing up and down ramp 20 track through pollen 60, collecting it on their legs and body hairs and later dispersing it among their fellow bees. Within a few minutes of depositing a gram of pollen within the hive entrance container formed by ramp 20, the pollen is spread throughout the bees in the colony, who carry it to the orchard blossoms. If the pollen is placed in modifier 10 on a rainless morning while the bees are active, it will be distributed throughout the day to all the blossoms they visit.

For transporting hive 50, modifier 10 is turned to bring vent recess 17 into confrontation with hive entrance 51 as shown in FIG. 3. Like vent recess 16, vent recess 17 is preferably about one-eighth inch deep and extends, preferably without interruption, for the full distance between end regions 11. Since bees cannot pass through the narrow slot afforded by vent recess 17, they are trapped within hive 50 while being moved. At the same time, they get plenty of air and are safe from overheating, because they can fan air and vapor out through vent recess 17 as shown by the single line arrow in FIG. 4.

Figure 7:
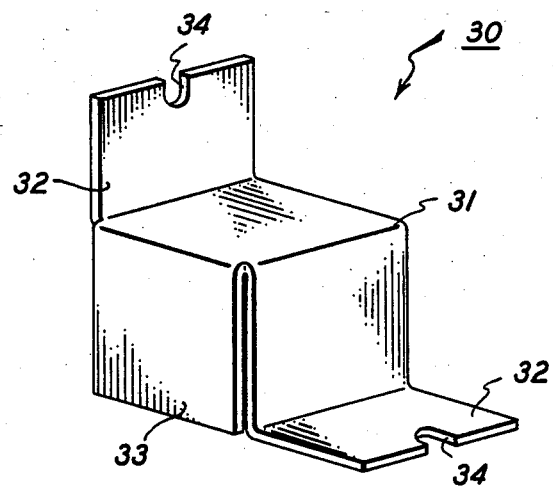
FIG. 7 is an isometric view of an end clamp useful for holding my hive entrance modifier in place on a hive.

During transport, when modifier 10 can be jounced out of position, I prefer holding it in place with a pair of end clamps 30. Clamps 30, as shown in FIG. 7, are preferably formed of metal in a right angle 31 that wraps over end regions 11 of body 10 and leads to a pair of flanges 32 by which clamps 30 can be fastened in place. An end tab 33 preferably closes the open end of each clamp to close any gap between body end 12 and an end of hive entrance 51. Each flange 32 has a notch 34 that can receive a nail 35 driven into bottom board 52 to hold clamp 30 in place. Clamps 30 can be arranged to overlap end regions 11 of body 10 and span any gap between body ends 12 and the ends of hive entrance 51.

Figure 6:
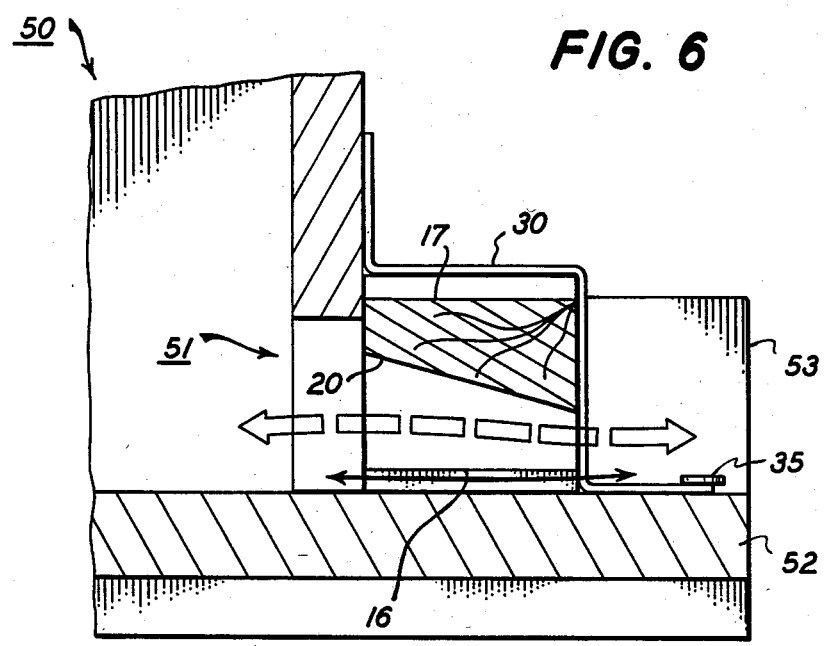
FIG. 6 is an enlarged cross-sectional view of my hive entrance modifier, taken along the line 6—6 of FIG. 5.

Body 10 can also protect hive entrance 51 in winter as shown in FIG. 5. For this, body 10 is turned and oriented so that vent recess 16 and ramp 20 face downward confronting bottom board 52. Ramp 20 is also preferably oriented to slope downward with increasing distance outward from hive entrance 51. This makes the outer entrance to ramp 20 as small as possible and allows bee traffic along the region of bottom board 52 underneath ramp 20 as shown by the broken line arrow in FIG. 6. Bees can then drag their dead out a horizontal path without having to climb ramp 20 in their weakened winter condition. The opening afforded by the small end of ramp 20 also foils predators such as mice, who might otherwise enter hive 50. The reduced opening helps conserve the hive's warmth for winter and still provides adequate venting along vent recess 16 as shown by the single line arrow. I prefer using end clamps 30 to hold body 10 in place in the winter position to prevent its removal by, for example, a skunk.

I claim:

1. A beehive entrance modifier formed as an elongated body that, when resting on a bottom board of said hive, extends over the length of said hive entrance, said modifier comprising:
    a. in a bee-enpollinating position, said body closing said hive entrance except for a vent region and a bee passageway substantially narrower than said hive entrance;
    b. said bee passageway being recessed far enough into a face of said body confronting said hive entrance to accommodate both incoming and outgoing bees;
    c. said passageway being formed as an inclined ramp sloping into said hive entrance from a top of said body above said hive entrance downward to said bottom board so that bees travel up and down said ramp;
    d. said body around said passageway containing and sheltering pollen poured into said passageway to rest on said bottom board in said hive entrance for enpollinating both incoming and outgoing bees; and
    e. said vent region extending along a substantial length of said hive entrance outside said passageway wherein said confronting face of said body is spaced from said hive entrance by a venting distance too small for a bee to pass through.

2. The modifier of claim 1 wherein, in a winter position, said vent region and said bee passageway are oriented to face said bottom board, and said body otherwise closes said hive entrance.

3. The modifier of claim 2 wherein said passageway in said winter position is small enough to block entry by a mouse.

4. The modifier of claim 1 wherein said top of said body is flat and provides a landing board for bees returning to said hive entrance.

5. The modifier of claim 1 wherein said vent region extends between end regions of said body and said bee passageway.

6. The modifier of claim 5 wherein said top of said body is flat and provides a landing board for bees returning to said hive entrance.

7. The modifier of claim 1 including means for extending said body for spanning varying widths of said hive entrance.

8. The modifier of claim 1 wherein side edges of said bee passageway are rounded.

9. The modifier of claim 1 wherein said slope of said ramp is 60° to 80° from horizontal.

10. The modifier of claim 1 wherein, in a transport position, a transport face of said body closes said hive entrance except for a vent region extending along and spaced from said hive entrance by a distance too small for a bee to pass through.

11. A method of enpollinating bees, said method using a hive entrance modifier and comprising:
   a. forming and positioning said hive entrance modifier to restrict bee traffic to a narrow passageway region of said hive entrance and to leave a ventilating gap not permitting bee traffic along substantially the rest of said hive entrance;
   b. forming the bee traffic passageway as an inclined ramp recessed into said modifier and sloping downward into said hive entrance from the top of said modifier at an upper region of said hive entrance; and
   c. pouring pollen into said bee traffic passageway to rest on a bottom board of said hive adjacent to said ramp where said pollen is contained and shielded from wind by said modifier and enpollinates bees moving in or out of said hive via said ramp.

12. The method of claim 11 including forming said ventilating gap and said bee traffic passageway in between end regions of said modifier engaging said hive entrance.

13. The method of claim 11 including sloping said ramp to incline 60° to 80° from horizontal.

14. The method of claim 13 including rounding end regions of said passageway.

15. The method of claim 11 including filling any gap between an end of said body and an end of said hive entrance.

16. the method of claim 11 including clamping said body in place.

17. The method of claim 11 including making said top of said modifier flat to serve as a landing board for bees returning to said hive entrance.

18. A method of enpollinating a hive of bees, said method comprising:
   a. forming a vent extending along the length of an entrance to said hive so that air and vapor, but not bees, can pass through said vent;
   b. restricting all bee traffic in and out of said hive to a narrow region of said entrance;
   c. forming said bee traffic region as an inclined ramp sloping upward and outward from a bottom of said hive entrance to a region above said hive entrance; and
   d. pouring pollen into said bee traffic region to rest on said bottom of said hive entrance adjacent to said ramp where said pollen is contained and shielded from wind and enpollinates bees moving in or out of said hive via said ramp.

19. The method of claim 18 including sloping said ramp to incline 60° to 80° from horizontal.

20. The method of claim 19 including rounding end regions of said ramp.

* * * * *